United States Patent
Shen et al.

(10) Patent No.: US 10,637,598 B2
(45) Date of Patent: Apr. 28, 2020

(54) PROTECTION PATH DETERMINATION METHOD AND DEVICE BASED ON RESILIENT OPTICAL NETWORK

(71) Applicant: SOOCHOW UNIVERSITY, Suzhou (CN)

(72) Inventors: Gangxiang Shen, Suzhou (CN); Fengxian Tang, Suzhou (CN); Zhechen Zhu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 281 days.

(21) Appl. No.: 15/578,696

(22) PCT Filed: Nov. 10, 2016

(86) PCT No.: PCT/CN2016/105341
§ 371 (c)(1),
(2) Date: Nov. 30, 2017

(87) PCT Pub. No.: WO2017/124819
PCT Pub. Date: Jul. 27, 2017

(65) Prior Publication Data
US 2018/0102864 A1 Apr. 12, 2018

(30) Foreign Application Priority Data
Jan. 20, 2016 (CN) .......................... 2016 1 0037074

(51) Int. Cl.
*H04J 3/08* (2006.01)
*H04L 12/24* (2006.01)
(Continued)

(52) U.S. Cl.
CPC ............ *H04J 3/085* (2013.01); *G06F 15/173* (2013.01); *H04B 10/12* (2013.01); *H04L 12/43* (2013.01);
(Continued)

(58) Field of Classification Search
CPC .... G06F 15/173; H04B 10/2504; H04J 3/085; H04J 3/0876; H04L 12/43;
(Continued)

(56) References Cited

U.S. PATENT DOCUMENTS 7,274,869 B1 * 9/2007 Pan ...................... H04B 10/032
398/17
8,879,904 B1 11/2014 Harley et al.
(Continued)

FOREIGN PATENT DOCUMENTS

CN 1934559 A 3/2007
CN 102647230 A 8/2012
(Continued)

OTHER PUBLICATIONS

Chen et al., Cost-Optimized Virtual Optical Network Mapping Approaches in Software-Defined Optical Networks, ZTE Technology Journal, vol. 21, No. 4, pp. 30-35 (published on line on Jun. 22, 2015).
(Continued)

*Primary Examiner* — John M Macilwinen
(74) *Attorney, Agent, or Firm* — SZDC Law P.C.

(57) ABSTRACT

A protection path determination method and apparatus based on an elastic optical network are provided. The method includes: searching a virtual working topology for a virtual working link satisfying a condition on receipt of a routing request of a target service; updating a residual bandwidth of the virtual working link if the virtual working link is found; otherwise, creating a working link for the target service and creating a virtual working link in the virtual working topology; searching a virtual protection topology for a virtual protection link satisfying a condition according to a shared path protection mechanism; updating a residual bandwidth of the virtual protection link if the virtual protection link is
(Continued)

found; otherwise, creating a protection link for the target service according to the shared path protection mechanism and creating a virtual protection link in the virtual protection topology.

5 Claims, 2 Drawing Sheets

(51) Int. Cl.
*H04L 12/26* (2006.01)
*G06F 15/173* (2006.01)
*H04B 10/00* (2013.01)
*H04L 12/43* (2006.01)

(52) U.S. Cl.
CPC .......... *H04L 41/0668* (2013.01); *H04L 41/12* (2013.01); *H04L 43/0876* (2013.01)

(58) Field of Classification Search
CPC . H04L 12/4641; H04L 41/0668; H04L 41/12; H04L 45/02; H04L 45/10; H04L 47/829
See application file for complete search history.

(56) References Cited

U.S. PATENT DOCUMENTS

| | | | |
|---|---|---|---|
| 9,054,955 B2* | 6/2015 | Handelman | H04J 14/0268 |
| 9,444,550 B2* | 9/2016 | Wang | H04J 14/0254 |
| 2005/0010681 A1 | 1/2005 | Katukam et al. | |
| 2018/0302316 A1* | 10/2018 | Ubaldi | H04L 45/125 |

FOREIGN PATENT DOCUMENTS

| | | |
|---|---|---|
| CN | 103179035 A | 6/2013 |
| CN | 103338414 A | 10/2013 |
| CN | 103595465 A | 2/2014 |
| CN | 105591939 A | 5/2016 |
| WO | 2012143814 A1 | 10/2012 |
| WO | 2015119704 A1 | 8/2015 |

OTHER PUBLICATIONS

Shen et al., Optical Design for Shared backup path protected elastic optical networks under Single-link failure, vol. 6, No. 7/Jul. 2014/J. Opt. Commun. Netw. pp. 649-659 (published on line on Jun. 30, 2014).

* cited by examiner

PROTECTION PATH DETERMINATION METHOD AND DEVICE BASED ON RESILIENT OPTICAL NETWORK

This application is a National Stage Application of PCT international patent application PCT/CN2016/105341, filed on Nov. 10, 2016, which claims the priority to Chinese Patent Application No. 201610037074.1 titled "PROTECTION PATH DETERMINATION METHOD AND DEVICE BASED ON RESILIENT OPTICAL NETWORK," filed with the Chinese State Intellectual Property Office on Jan. 20, 2016, both of which are incorporated herein by reference in their entireties.

FIELD

Background

In recent years, the elastic optical network has become a new technology with which better optical fiber spectral efficiency can be achieved. In such a network, an optical channel can provide a great bandwidth.

Network protection is critical for the elastic optical network, where a path pair including a working path and a protection path is established between a node pair for providing protection against a network failure. Among various proposed network protection technologies, sharing a protection path is considered to be the most effective one due to advantages of being simple, rapid and effective.

However, in the conventional technology, the working path and the protection path for each service to be routed are determined in the optical layer, and a new protection path cannot be created by sharing created protection paths for other services each time, resulting in a waste of resources.

SUMMARY

In view of this, a protection path determination method and a protection path determination apparatus based on an elastic optical network are provided according to the present disclosure, to solve the problem in the conventional technology that the created protection paths and the allocated protection resources for other services in an optical layer cannot be shared.

The following solutions are provided to achieve the above object.

A protection path determination method based on an elastic optical network includes:
step S100: receiving a routing request of a target service, where the routing request includes locations of a pair of nodes for transmitting and receiving the target service, and a bandwidth requirement of the target service;
step S110: searching a pre-created virtual working topology Gw for a virtual working link which meets a demand regarding the locations of the pair of nodes and the bandwidth requirement, where the virtual working topology Gw includes virtual nodes having a one-to-one correspondence with nodes in the elastic optical network, and virtual working links having a one-to-one correspondence with existing working links between the nodes in the elastic optical network;
step S120: creating a working link for the pair of nodes in the elastic optical network, creating a virtual working link corresponding to the created working link in the virtual working topology Gw, and turning to step S140, in a case that the virtual working link is not found;
step S130: updating a residual bandwidth capacity of the virtual working link using a bandwidth capacity corresponding to the bandwidth requirement, and turning to step S140, in a case that the virtual working link is found;
step S140: searching a pre-created virtual protection topology Gp for a virtual protection link which meets the demand regarding the locations of the pair of nodes and the bandwidth requirement according to a shared path protection mechanism, where the virtual protection topology Gp includes virtual nodes having a one-to-one correspondence with the nodes in the elastic optical network, and virtual protection links having a one-to-one correspondence with existing protection links between the nodes in the elastic optical network;
step S150: updating a residual bandwidth capacity of the virtual protection link using the bandwidth capacity corresponding to the bandwidth requirement in a case that the virtual protection link is found; and
step S160: creating a protection link for the pair of nodes in the elastic optical network according to the shared path protection mechanism, and creating a virtual protection link corresponding to the created protection link in the virtual protection topology Gp, in a case that the virtual protection link is not found.

Preferably, the searching the pre-created virtual working topology Gw for the virtual working link which meets the demand regarding the locations of the pair of nodes and the bandwidth requirement may include:
excluding, from the virtual working topology Gw, a virtual working link of which a residual capacity is lower than the bandwidth requirement to acquire an adjusted virtual working topology Gw; and
searching the adjusted virtual working topology Gw for a virtual working link which takes the locations of the pair of nodes as a starting location and a terminating location and has a shortest path using a Dijkstra algorithm.

Preferably, the searching the pre-created virtual protection topology Gp for the virtual protection link which meets the demand regarding the locations of the pair of nodes and the bandwidth requirement according to the shared path protection mechanism may include:
excluding a virtual protection link satisfying a first condition from the virtual protection topology Gp according to the shared path protection mechanism to acquire an adjusted virtual protection topology Gp, where
the virtual protection link satisfying the first condition includes:
a virtual protection link of which a total capacity is lower than the bandwidth requirement, a virtual protection link in the virtual protection topology Gp for a service other than the target service of which a working link intersects with a working link of the target service, and a virtual protection link corresponding to a protection link in the elastic optical network, the protection link overlapping with a working link in the elastic optical network; and
searching the adjusted virtual protection topology Gp for a virtual protection link which takes the locations of the pair of nodes as a starting location and a terminating location and has a shortest path using a Dijkstra algorithm.

Preferably, the creating the working link for the pair of nodes in the elastic optical network may include:

calculating the number of spectrum time slots required by spectrum planes in different modulation formats using an equation $$F = \frac{B_R}{B_i},$$

where F represents the number of spectrum time slots, $B_R$ represents the bandwidth requirement, i represents a number of the modulation format, and $B_i$ represents a frequency slot capacity of an i-th modulation format;

creating a spectrum plane list based on the calculated number of spectrum time slots required by spectrum planes in respective modulation formats, where each spectrum plane in the spectrum plane list includes F spectrum time slots, and the spectrum plane is labeled by a corresponding modulation format;

deleting unavailable links in each of the spectrum planes;

searching the spectrum planes for a target path in order, where a starting node and a terminating node of the target path are the same as the pair of nodes, and a length of the target path is less than a transmission distance in the modulation format corresponding to the spectrum plane; and determining the target path found firstly as the working link.

Preferably, the creating the protection link for the pair of nodes in the elastic optical network according to the shared path protection mechanism may include:

calculating the number of spectrum time slots required by spectrum planes in different modulation formats using an equation $$F = \frac{B_R}{B_i},$$

where F represents the number of spectrum time slots, $B_R$ represents the bandwidth requirement, i represents a number of the modulation format, and $B_i$ represents a frequency slot capacity of an i-th modulation format;

creating a spectrum plane list based on the calculated number of spectrum time slots required by spectrum planes in respective modulation formats, where each spectrum plane in the spectrum plane list includes F spectrum time slots, and the spectrum plane is labeled by a corresponding modulation format;

deleting unavailable links in each of the spectrum planes, and deleting the working link in the elastic optical network corresponding to the virtual working link found in step S110 and the working link in the elastic optical network created in step S120;

searching the spectrum planes for a target path in order, where a starting node and a terminating node of the target path are the same as the pair of nodes, and a length of the target path is less than a transmission distance in the modulation format corresponding to the spectrum plane; and determining the target path found firstly as the protection link.

A protection path determination apparatus based on an elastic optical network includes:

a routing request reception unit configured to receive a routing request of a target service, where the routing request includes locations of a pair of nodes for transmitting and receiving the target service, and a bandwidth requirement of the target service;

a virtual working link searching unit configured to search a pre-created virtual working topology Gw for a virtual working link which meets a demand regarding the locations of the pair of nodes and the bandwidth requirement, where the virtual working topology Gw includes virtual nodes having a one-to-one correspondence with nodes in the elastic optical network, and virtual working links having a one-to-one correspondence with existing working links between the nodes in the elastic optical network;

a working link creation unit configured to create a working link for the pair of nodes in the elastic optical network, and create a virtual working link corresponding to the created working link in the virtual working topology Gw, in a case of determining that the virtual working link is not found;

a virtual working link updating unit configured to update a residual bandwidth capacity of the virtual working link using a bandwidth capacity corresponding to the bandwidth requirement, in a case of determining that the virtual working link is found;

a virtual protection link searching unit configured to search a pre-created virtual protection topology Gp for a virtual protection link which meets the demand regarding the locations of the pair of nodes and the bandwidth requirement according to a shared path protection mechanism, where the virtual protection topology Gp includes virtual nodes having a one-to-one correspondence with the nodes in the elastic optical network, and virtual protection links having a one-to-one correspondence with existing protection links between the nodes in the elastic optical network;

a virtual protection link updating unit configured to update a residual bandwidth capacity of the virtual protection link using the bandwidth capacity corresponding to the bandwidth requirement, in a case of determining that the virtual protection link is found; and a protection link creation unit configured to create a protection link for the pair of nodes in the elastic optical network according to the shared path protection mechanism, and create a virtual protection link corresponding to the created protection link in the virtual protection topology Gp, in a case of determining that the virtual protection link is not found.

Preferably, the virtual working link searching unit may include:

a virtual working topology adjustment unit configured to exclude, from the virtual working topology Gw, a virtual working link of which a residual capacity is lower than the bandwidth requirement to acquire an adjusted virtual working topology Gw; and a virtual working link calculation unit configured to search the adjusted virtual working topology Gw for a virtual working link which takes the locations of the pair of nodes as a starting location and a terminating location and has a shortest path using a Dijkstra algorithm.

Preferably, the virtual protection link searching unit may include:

a virtual protection topology adjustment unit configured to exclude a virtual protection link satisfying a first condition from the virtual protection topology Gp according to the shared path protection mechanism to acquire an adjusted virtual protection topology Gp, where the virtual protection link satisfying the first condition includes:

a virtual protection link of which a total capacity is lower than the bandwidth requirement, a virtual protection link in the virtual protection topology Gp for a service other than the target service of which a working link intersects with a working link of the target service, and a virtual protection link corresponding to a protection link in the elastic optical network, the protection link overlapping with a working link in the elastic optical network; and a virtual protection link calculation unit configured to search the adjusted virtual protection topology Gp for a virtual protection link which takes the locations of the pair of nodes as a starting location and a terminating location and has a shortest path using a Dijkstra algorithm.

Preferably, the working link creation unit may include:

a first working link creation subunit configured to calculate the number of spectrum time slots required by spectrum planes in different modulation formats using an equation $$F = \frac{B_R}{B_i},$$

where F represents the number of spectrum time slots, $B_R$ represents the bandwidth requirement, i represents a number of the modulation format, and $B_i$ represents a frequency slot capacity of an i-th modulation format;

a second working link creation subunit configured to create a spectrum plane list based on the calculated number of spectrum time slots required by spectrum planes in respective modulation formats, where each spectrum plane in the spectrum plane list includes F spectrum time slots, and the spectrum plane is labeled by a corresponding modulation format;

a third working link creation subunit configured to delete unavailable links in each of the spectrum planes;

a fourth working link creation subunit configured to search the spectrum planes for a target path in order, where a starting node and a terminating node of the target path are the same as the pair of nodes, and a length of the target path is less than a transmission distance in the modulation format corresponding to the spectrum plane; and a fifth working link creation subunit configured to determine the target path found firstly as the working link.

Preferably, the protection link creation unit may include:

a first protection link creation subunit configured to calculate the number of spectrum time slots required by spectrum planes in different modulation formats using an equation $$F = \frac{B_R}{B_i},$$

where F represents the number of spectrum time slots, $B_R$ represents the bandwidth requirement, i represents a number of the modulation format, and $B_i$ represents a frequency slot capacity of an i-th modulation format;

a second protection link creation subunit configured to create a spectrum plane list based on the calculated number of spectrum time slots required by spectrum planes in respective modulation formats, where each spectrum plane in the spectrum plane list includes F spectrum time slots, and the spectrum plane is labeled by a corresponding modulation format;

a third protection link creation subunit configured to delete unavailable links in each of the spectrum planes, and delete the working link in the elastic optical network corresponding to the virtual working link found by the virtual working link searching unit and the working link in the elastic optical network created by the working link creation unit;

a fourth protection link creation subunit configured to search the spectrum planes for a target path in order, where a starting node and a terminating node of the target path are the same as the pair of nodes, and a length of the target path is less than a transmission distance in the modulation format corresponding to the spectrum plane; and a fifth protection link creation subunit configured to determine the target path found firstly as the protection link.

As can be seen from the above technical solutions, in the protection path determination method based on an elastic optical network according to the embodiment of the present disclosure, the virtual working topology Gw and the virtual protection topology Gp are introduced. On receipt of the routing request of the target service, the virtual working topology Gw is first searched for the virtual working link satisfying the conditions. In a case that the virtual working link satisfying the conditions is found, the residual bandwidth capacity of the virtual working link is updated using the bandwidth capacity corresponding to the bandwidth requirement, i.e., the bandwidth capacity corresponding to the bandwidth requirement is added to the used capacity; and in a case that the virtual working link satisfying the conditions is not found, the working link is created for the target service in the elastic optical network, and the corresponding virtual working link is created in the virtual working topology Gw. Further, the virtual protection topology Gp is searched for the virtual protection link satisfying the conditions according to the shared path protection mechanism. In a case that the virtual protection link satisfying the conditions is found, the residual bandwidth capacity of the virtual protection link is updated using the bandwidth capacity corresponding to the bandwidth requirement; and in a case that the virtual protection link satisfying the conditions is not found, the protection link is created for the target service in the elastic optical network according to the shared path protection mechanism, and the corresponding virtual protection link is created in the virtual protection topology Gp. As can be seen, according to the present disclosure, on receipt of the routing request of the target service, the working path and the protection path are not directly created in the elastic optical network. Instead, the created working path and the created protection path which satisfy the requirements of the target service are first searched; and in a case that the created working path and the created protection path which satisfy the requirements of the target service are found, the target service flow is inserted in the found working path. Therefore, it is unnecessary to create a new working path, thereby saving network resources. In addition, during the process of searching for the protection path, the protection resource occupied by other protection service can be shared as long as a working link corresponding to the other protection service does not intersect with the working link for the target service.

BRIEF DESCRIPTION OF THE DRAWINGS

The drawings to be used in the description of the embodiments of the application or the conventional technology will be described briefly as follows, so that the technical solutions according to the embodiments of the present application or according to the conventional technology will become clearer. It is apparent that the drawings in the following description only illustrate some embodiments of the present application. For those skilled in the art, other drawings may be obtained according to these drawings without any creative work.

DETAILED DESCRIPTION OF THE EMBODIMENTS

Technical solutions according to embodiments of the present disclosure are described clearly and completely hereinafter in conjunction with drawings used in the embodiments of the present disclosure. Apparently, the described embodiments are only some rather than all of the embodiments of the present disclosure. Any other embodiments obtained by those skilled in the art based on the embodiments of the present disclosure without any creative work fall in the scope of protection of the present disclosure.

Figure 1:
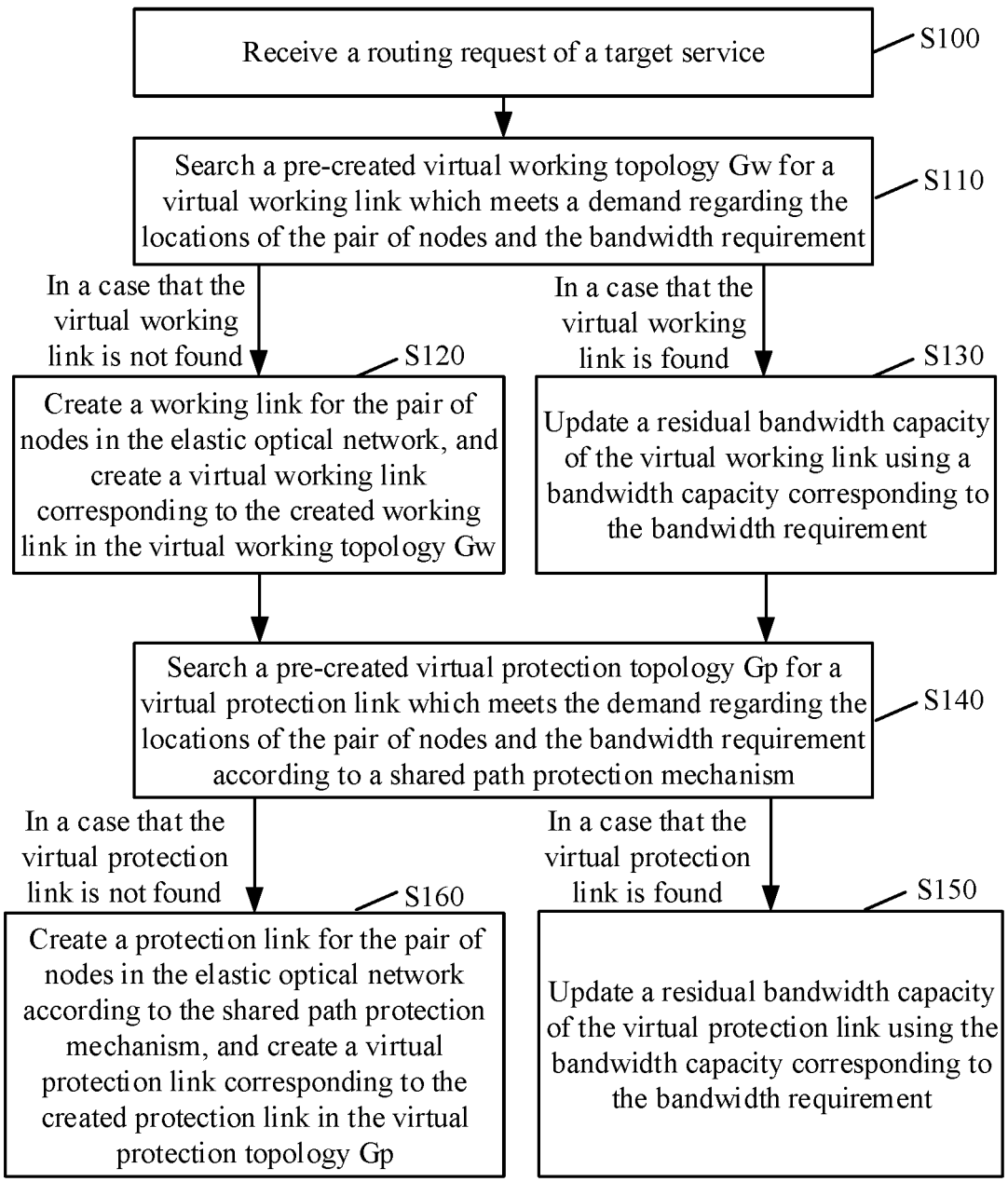
FIG. 1 is a flow chart of a protection path determination method based on an elastic optical network according to an embodiment of the present disclosure.

Reference is made to FIG. 1, which is a flow chart of a protection path determination method based on an elastic optical network according to an embodiment of the present disclosure.

As shown in FIG. 1, the method includes the following steps S100 to S160.

In step S100, a routing request of a target service is received.

The routing request includes locations of a pair of nodes for transmitting and receiving the target service, and a bandwidth requirement of the target service.

Specifically, the transmission node and the reception node of the target service which constitute a node pair are indicated in the routing request. In addition, the bandwidth requirement of the target service is also indicated in the routing request.

In step S110, a pre-created virtual working topology Gw is searched for a virtual working link which meets a demand regarding the locations of the pair of nodes and the bandwidth requirement.

The virtual working topology Gw includes virtual nodes having a one-to-one correspondence with nodes in the elastic optical network, and virtual working links having a one-to-one correspondence with existing working links between the nodes in the elastic optical network.

In a case that the virtual working link is not found, step S120 is executed. That is, a working link is created for the pair of nodes in the elastic optical network, and a virtual working link corresponding to the created working link is created in the virtual working topology Gw. Then, step S140 is executed.

In a case that the virtual working link is found, step S130 is executed. That is, a residual bandwidth capacity of the virtual working link is updated using a bandwidth capacity corresponding to the bandwidth requirement. Then, step S140 is executed.

Specifically, the bandwidth requirement is specified in the routing request of the target service. That is, the bandwidth capacity required by the target service is specified. Therefore, after the virtual working link is found, the target service is inserted in the working link in the elastic optical network corresponding to the virtual working link. Meanwhile, the residual bandwidth capacity of the virtual working link is updated, that is, the bandwidth capacity is added to the used capacity of the virtual working link.

In step S140, a pre-created virtual protection topology Gp is searched for a virtual protection link which meets the demand regarding the locations of the pair of nodes and the bandwidth requirement according to a shared path protection mechanism.

The virtual protection topology Gp includes virtual nodes having a one-to-one correspondence with the nodes in the elastic optical network, and virtual protection links having a one-to-one correspondence with existing protection links between the nodes in the elastic optical network.

During the process of searching for the virtual protection link, a resource of a protection link in the elastic optical network corresponding to an existing virtual protection link is shared according to the shared path protection mechanism.

In the elastic optical network layer, according to the shared path protection mechanism, protection resources on a same link through which multiple protection links pass are allowed to be shared, as long as the working links corresponding to the multiple protection links do not intersect.

In a case that the virtual protection link is found, step S150 is executed. That is, a residual bandwidth capacity of the virtual protection link is updated using the bandwidth capacity corresponding to the bandwidth requirement.

Specifically, the process of updating the residual bandwidth capacity of the virtual protection link is similar to the above process of updating the residual bandwidth capacity of the virtual working link. The two processes may be referred to each other.

In a case that the virtual protection link is not found, step S160 is executed. That is, a protection link is created for the pair of nodes in the elastic optical network according to the shared path protection mechanism, and a virtual protection link corresponding to the created protection link is created in the virtual protection topology Gp.

Specifically, during the process of creating the protection link, a used frequency slot resource is shared using a technology for sharing protection paths.

In the protection path determination method based on an elastic optical network according to the embodiment of the present disclosure, the virtual working topology Gw and the virtual protection topology Gp are introduced. On receipt of the routing request of the target service, the virtual working topology Gw is first searched for the virtual working link satisfying the conditions. In a case that the virtual working link satisfying the conditions is found, the residual bandwidth capacity of the virtual working link is updated using the bandwidth capacity corresponding to the bandwidth requirement, i.e., the bandwidth capacity corresponding to the bandwidth requirement is added to the used capacity; and in a case that the virtual working link satisfying the conditions is not found, the working link is created for the target service in the elastic optical network, and the corresponding virtual working link is created in the virtual working topology Gw. Further, the virtual protection topology Gp is searched for the virtual protection link satisfying the conditions according to the shared path protection mechanism. In a case that the virtual protection link satisfying the conditions is found, the residual bandwidth capacity of the virtual protection link is updated using the bandwidth capacity corresponding to the bandwidth requirement; and in a case that the virtual protection link satisfying the conditions is not found, the protection link is created for the target service in the elastic optical network according to the shared path protection mechanism, and the corresponding virtual protection link is created in the virtual protection topology Gp. As can be seen, according to the present disclosure, on receipt of the routing request of the target service, the working path and the protection path are not directly created in the elastic optical network. Instead, the created working path and the created protection path which satisfy the requirements of the target service are first searched; and in a case that the created working path and the created protection path which satisfy the requirements of the target service are found, the target service flow is inserted in the found working path. Therefore, it is unnecessary to create a new working path, thereby saving network resources. In addition, during the process of searching for the protection path, the protection resource occupied by other protection service can be shared as long as a working link corresponding to the other protection service does not intersect with the working link for the target service.

Optionally, in the above step S110, searching the pre-created virtual working topology Gw for the virtual working link which meets the demand regarding the locations of the pair of nodes and the bandwidth requirement may be implemented in the following manner.

First, a virtual working link of which a residual capacity is lower than the bandwidth requirement is excluded from the virtual working topology Gw to acquire an adjusted virtual working topology Gw.

Then, the adjusted virtual working topology Gw is searched for a virtual working link which takes the locations of the pair of nodes as a starting location and a terminating location and has a shortest path using a Dijkstra algorithm.

Specifically, the transmission node and the reception node of the target service are specified in the routing request of the target service. Therefore, the path to be searched in the adjusted virtual working topology Gw is the shortest path which takes the transmission node as the starting node and takes the reception node as the terminating node.

Optionally, in the above step S140, searching the pre-created virtual protection topology Gp for the virtual protection link which meets the demand regarding the locations of the pair of nodes and the bandwidth requirement according to the shared path protection mechanism may be implemented in the following manner.

First, a virtual protection link satisfying a first condition is excluded from the virtual protection topology Gp according to the shared path protection mechanism to acquire an adjusted virtual protection topology Gp.

The virtual protection link satisfying the first condition includes:

1, a virtual protection link of which a total capacity is lower than the bandwidth requirement; 2, a virtual protection link in the virtual protection topology Gp for a service other than the target service of which a working link intersects with the working link of the target service; and 3, a virtual protection link corresponding to a protection link in the elastic optical network, the protection link overlapping with a working link in the elastic optical network.

Next, the adjusted virtual protection topology Gp is searched for a virtual protection link which takes the locations of the pair of nodes as a starting location and a terminating location and has a shortest path using the Dijkstra algorithm.

Optionally, in the above step S120, creating the working link for the pair of nodes in the elastic optical network may be implemented in the following manner.

First, the number of spectrum time slots required by spectrum planes in different modulation formats is calculated using an equation $$F = \frac{B_R}{B_i},$$

where F represents the number of spectrum time slots, $B_R$ represents the bandwidth requirement, i represents a number of the modulation format, and $B_i$ represents a frequency slot capacity of an i-th modulation format.

There are various modulation formats, and the following three modulation formats are provided as examples in the present disclosure, as shown in Table 1.

Frequency slot capacities and transmission distances in different modulation formats

TABLE 1

| Modulation format | Frequency slot capacity (Gb/s) | Transmission distance (km) |
| --- | --- | --- |
| BPSK | 25 | 4000 |
| QPSK | 50 | 2000 |
| 8QAM | 75 | 1000 |

In Table 1, the BPSK modulation format, the QPSK modulation format and the 8QAM modulation format are included. Frequency slot capacities and transmission distances in the three modulation formats are shown in table 1.

Second, a spectrum plane list is created based on the calculated number of spectrum time slots required by spectrum planes in respective modulation formats.

Each spectrum plane in the spectrum plane list includes F spectrum time slots, and the spectrum plane is labeled by a corresponding modulation format.

Third, unavailable links in each of the spectrum planes are deleted.

The unavailable link may be, for example, a link which does not have F consecutive idle spectrum time slots.

Fourth, the spectrum planes are searched for a target path in order. A starting node and a terminating node of the target path are the same as the pair of nodes, and a length of the target path is less than a transmission distance in the modulation format corresponding to the spectrum plane.

Fifth, the target path found firstly is determined as the working link.

Similar to the above embodiment, in the above step S160, creating the protection link for the pair of nodes in the elastic optical network according to the shared path protection mechanism may be implemented in the following manner.

First, the number of spectrum time slots required by spectrum planes in different modulation formats is calculated using an equation $$F = \frac{B_R}{B_i},$$

where F represents the number of spectrum time slots, $B_R$ represents the bandwidth requirement, i represents a number of the modulation formats, and $B_i$ represents a frequency slot capacity of an i-th modulation format.

Second, a spectrum plane list is created based on the calculated number of spectrum time slots required by spectrum planes in respective modulation formats.

Each spectrum plane in the spectrum plane list includes F spectrum time slots, and the spectrum plane is labeled by a corresponding modulation format.

Third, unavailable links in each of the spectrum planes are deleted, and the working link in the elastic optical network corresponding to the virtual working link found in step S110 and the working link in the elastic optical network created in step S120 are deleted.

The unavailable link may be, for example, a link which does not have F consecutive idle spectrum time slots.

Fourth, the spectrum planes are searched for a target path in order. A starting node and a terminating node of the target path are the same as the pair of nodes, and a length of the target path is less than a transmission distance in the modulation format corresponding to the spectrum plane.

Fifth, the target path found firstly is determined as the protection link.

In the following, a protection path determination apparatus based on an elastic optical network according to an embodiment of the present disclosure is described. The following protection path determination apparatus based on an elastic optical network and the above protection path determination method based on an elastic optical network may be referred to each other.

Figure 2:
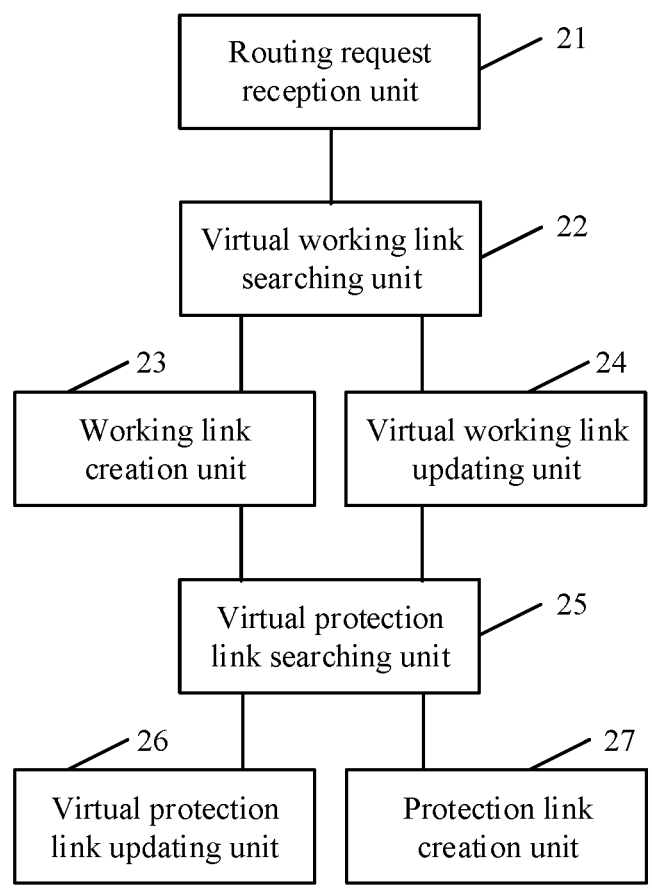
FIG. 2 is a schematic structural diagram of a protection path determination apparatus based on an elastic optical network according to an embodiment of the present disclosure.

Reference is made to FIG. 2, which is a schematic structural diagram of a protection path determination apparatus based on an elastic optical network according to an embodiment of the present disclosure.

As shown in FIG. 2, the apparatus includes the following units 21 to 27.

A routing request reception unit 21 is configured to receive a routing request of a target service. The routing request includes locations of a pair of nodes for transmitting and receiving the target service, and a bandwidth requirement of the target service.

A virtual working link searching unit 22 is configured to search a pre-created virtual working topology Gw for a virtual working link which meets a demand regarding the locations of the pair of nodes and the bandwidth requirement. The virtual working topology Gw includes virtual nodes having a one-to-one correspondence with nodes in the elastic optical network, and virtual working links having a one-to-one correspondence with existing working links between the nodes in the elastic optical network.

A working link creation unit 23 is configured to create a working link for the pair of nodes in the elastic optical network, and create a virtual working link corresponding to the created working link in the virtual working topology Gw, in a case of determining that the virtual working link is not found.

A virtual working link updating unit 24 is configured to update a residual bandwidth capacity of the virtual working link using a bandwidth capacity corresponding to the bandwidth requirement, in a case of determining that the virtual working link is found.

A virtual protection link searching unit 25 is configured to search a pre-created virtual protection topology Gp for a virtual protection link which meets the demand regarding the locations of the pair of nodes and the bandwidth requirement according to a shared path protection mechanism. The virtual protection topology Gp includes virtual nodes having a one-to-one correspondence with the nodes in the elastic optical network, and virtual protection links having a one-to-one correspondence with existing protection links between the nodes in the elastic optical network.

A virtual protection link updating unit 26 is configured to update a residual bandwidth capacity of the virtual protection link using the bandwidth capacity corresponding to the bandwidth requirement, in a case of determining that the virtual protection link is found.

A protection link creation unit 27 is configured to create a protection link for the pair of nodes in the elastic optical network according to the shared path protection mechanism, and create a virtual protection link corresponding to the created protection link in the virtual protection topology Gp, in a case of determining that the virtual protection link is not found.

In the protection path determination apparatus based on an elastic optical network according to the embodiment of the present disclosure, the virtual working topology Gw and the virtual protection topology Gp are introduced. On receipt of the routing request of the target service, the virtual working topology Gw is first searched for the virtual working link satisfying the conditions. In a case that the virtual working link satisfying the conditions is found, the residual bandwidth capacity of the virtual working link is updated using the bandwidth capacity corresponding to the bandwidth requirement, i.e., the bandwidth capacity corresponding to the bandwidth requirement is added to the used capacity; and in a case that the virtual working link satisfying the conditions is not found, the working link is created for the target service in the elastic optical network, and the corresponding virtual working link is created in the virtual working topology Gw. Further, the virtual protection topology Gp is searched for the virtual protection link satisfying the conditions according to the shared path protection mechanism. In a case that the virtual protection link satisfying the conditions is found, the residual bandwidth capacity of the virtual protection link is updated using the bandwidth capacity corresponding to the bandwidth requirement; and in a case that the virtual protection link satisfying the conditions is not found, the protection link is created for the target service in the elastic optical network according to the shared path protection mechanism, and the corresponding virtual protection link is created in the virtual protection topology Gp. As can be seen, according to the present disclosure, on receipt of the routing request of the target service, the working path and the protection path are not directly created in the elastic optical network. Instead, the created working path and the created protection path which satisfy the requirements of the target service are first searched; and in a case that the created working path and the created protection path which satisfy the requirements of the target service are found, the target service flow is inserted in the found working path. Therefore, it is unnecessary to create a new working path, thereby saving network resources. In addition, during the process of searching for the protection path, the protection resource occupied by other protection service can be shared as long as a working link corresponding to the other protection service does not intersect with the working link for the target service.

Optionally, the virtual working link searching unit may include a virtual working topology adjustment unit and a virtual working link calculation unit.

The virtual working topology adjustment unit is configured to exclude, from the virtual working topology Gw, a virtual working link of which a residual capacity is lower than the bandwidth requirement to acquire an adjusted virtual working topology Gw.

The virtual working link calculation unit is configured to search the adjusted virtual working topology Gw for a virtual working link which takes the locations of the pair of nodes as a starting location and a terminating location and has a shortest path using a Dijkstra algorithm.

Optionally, the virtual protection link searching unit may include a virtual protection topology adjustment unit and a virtual protection link calculation unit.

The virtual protection topology adjustment unit is configured to exclude a virtual protection link satisfying a first condition from the virtual protection topology Gp according to the shared path protection mechanism, to acquire an adjusted virtual protection topology Gp.

The virtual protection link satisfying the first condition includes:
  a virtual protection link of which a total capacity is lower than the bandwidth requirement, a virtual protection link in the virtual protection topology Gp for a service other than the target service of which a working link intersects with the working link of the target service, and a virtual protection link corresponding to a protection link in the elastic optical network, the protection link overlapping with a working link in the elastic optical network.

The virtual protection link calculation unit is configured to search the adjusted virtual protection topology Gp for a virtual protection link which takes the locations of the pair of nodes as a starting location and a terminating location and has a shortest path using the Dijkstra algorithm.

Optionally, the working link creation unit may include first to fifth working link creation subunits.

The first working link creation subunit is configured to calculate the number of spectrum time slots required by spectrum planes in different modulation formats using an equation $$F = \frac{B_R}{B_i},$$

where F represents the number of spectrum time slots, $B_R$ represents the bandwidth requirement, i represents a number of the modulation format, and $B_i$ represents a frequency slot capacity of an i-th modulation format.

The second working link creation subunit is configured to create a spectrum plane list based on the calculated number of spectrum time slots required by spectrum planes in respective modulation formats. Each spectrum plane in the spectrum plane list includes F spectrum time slots, and the spectrum plane is labeled by a corresponding modulation format.

The third working link creation subunit is configured to delete unavailable links in each of the spectrum planes.

The fourth working link creation subunit is configured to search the spectrum planes for a target path in order. A starting node and a terminating node of the target path are the same as the pair of nodes, and a length of the target path is less than a transmission distance in the modulation format corresponding to the spectrum plane.

The fifth working link creation subunit is configured to determine the target path found firstly as the working link.

Optionally, the protection link creation unit may include first to fifth protection link creation subunits.

The first protection link creation subunit is configured to calculate the number of spectrum time slots required by spectrum planes in different modulation formats using an equation $$F = \frac{B_R}{B_i},$$

where F represents the number of spectrum time slots, $B_R$ represents the bandwidth requirement, i represents a number of the modulation format, and $B_i$ represents a frequency slot capacity of an i-th modulation format.

The second protection link creation subunit is configured to create a spectrum plane list based on the calculated number of spectrum time slots required by spectrum planes in respective modulation formats. Each spectrum plane in the spectrum plane list includes F spectrum time slots, and the spectrum plane is labeled by a corresponding modulation format.

The third protection link creation subunit is configured to delete unavailable links in each of the spectrum planes, and delete the working link in the elastic optical network corresponding to the virtual working link found by the virtual working link searching unit and the working link in the elastic optical network created by the working link creation unit.

The fourth protection link creation subunit is configured to search the spectrum planes for a target path in order. A starting node and a terminating node of the target path are the same as the pair of nodes, and a length of the target path is less than a transmission distance in the modulation format corresponding to the spectrum plane.

The fifth protection link creation subunit is configured to determine the target path found firstly as the protection link.

Finally, it should be further noted that the relationship terminologies such as "first", "second" and the like are only used herein to distinguish one entity or working from another, rather than to necessitate or imply that the actual relationship or order exists between the entities or workings. Furthermore, terms of "include", "comprise" or any other variants are intended to be non-exclusive. Therefore, a process, method, article or device including a plurality of elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

The embodiments in the present disclosure are described in progressive manner. Each embodiment mainly focuses on an aspect different from other embodiments, and for the same or similar parts among the embodiments, one may refer to description of other embodiments.

The above illustration of the disclosed embodiments enables those skilled in the art to implement or practice the present disclosure. Many changes to these embodiments are apparent for those skilled in the art, and general principles defined herein can be implemented in other embodiments without departing from the spirit or scope of the present disclosure. Hence, the present disclosure is not limited to the embodiments disclosed herein, but is to conform to the widest scope consistent with principles and novel features disclosed herein.

The invention claimed is:

1. A protection path determination method based on an elastic optical network, comprising:
    step S100: receiving a routing request of a target service, wherein the routing request comprises locations of a pair of nodes for transmitting and receiving the target service, and a bandwidth requirement of the target service;
    step S110: searching a pre-created virtual working topology Gw for a virtual working link which meets a demand regarding the locations of the pair of nodes and the bandwidth requirement, wherein the virtual working topology Gw comprises virtual nodes having a one-to-one correspondence with nodes in the elastic optical network, and virtual working links having a one-to-one correspondence with existing working links between the nodes in the elastic optical network;
    step S120: in a case that the virtual working link is not found, creating a working link for the pair of nodes in the elastic optical network, creating a virtual working link corresponding to the created working link in the virtual working topology Gw, and turning to step S140;
    step S130: updating a residual bandwidth capacity of the virtual working link using a bandwidth capacity corresponding to the bandwidth requirement, and turning to step S140, in a case that the virtual working link is found;
    step S140: searching a pre-created virtual protection topology Gp for a virtual protection link which meets the demand regarding the locations of the pair of nodes and the bandwidth requirement according to a shared path protection mechanism, wherein the virtual protection topology Gp comprises virtual nodes having a one-to-one correspondence with the nodes in the elastic optical network, and virtual protection links having a one-to-one correspondence with existing protection links between the nodes in the elastic optical network;
    step S150: updating a residual bandwidth capacity of the virtual protection link using the bandwidth capacity corresponding to the bandwidth requirement, in a case that the virtual protection link is found; and
    step S160: in a case that the virtual protection link is not found, creating a protection link for the pair of nodes in the elastic optical network according to the shared path protection mechanism, and creating a virtual protection link corresponding to the created protection link in the virtual protection topology Gp.

2. The method according to claim 1, wherein the searching the pre-created virtual working topology Gw for the virtual working link which meets the demand regarding the locations of the pair of nodes and the bandwidth requirement comprises:
    excluding, from the virtual working topology Gw, a virtual working link of which a residual capacity is lower than the bandwidth requirement to acquire an adjusted virtual working topology Gw; and
    searching the adjusted virtual working topology Gw for a virtual working link which takes the locations of the pair of nodes as a starting location and a terminating position and has a shortest path using a Dijkstra algorithm.

3. The method according to claim 1, wherein the searching the pre-created virtual protection topology Gp for the virtual protection link which meets the demand regarding the locations of the pair of nodes and the bandwidth requirement according to the shared path protection mechanism comprises:
    excluding a virtual protection link satisfying a first condition from the virtual protection topology Gp according to the shared path protection mechanism to acquire an adjusted virtual protection topology Gp, wherein
    the virtual protection link satisfying the first condition comprises:
    a virtual protection link of which a total capacity is lower than the bandwidth requirement, a virtual protection link in the virtual protection topology Gp for a service other than the target service of which a working link intersects with a working link of the target service, and a virtual protection link corresponding to a protection link in the elastic optical network, the protection link overlapping with a working link in the elastic optical network; and
    searching the adjusted virtual protection topology Gp for a virtual protection link which takes the locations of the pair of nodes as a starting location and a terminating location and has a shortest path using a Dijkstra algorithm.

4. The method according to claim 1, wherein the creating the working link for the pair of nodes in the elastic optical network comprises:
    calculating the number of spectrum time slots required by spectrum planes in different modulation formats using an equation $$F = \frac{B_R}{B_i},$$

where F represents the number of spectrum time slots, $B_R$ represents the bandwidth requirement, i represents a number of the modulation format, and $B_i$ represents a frequency slot capacity of an i-th modulation format;
    creating a spectrum plane list based on the calculated number of spectrum time slots required by spectrum planes in respective modulation formats, wherein each spectrum plane in the spectrum plane list comprises F spectrum time slots, and the spectrum plane is labeled by a corresponding modulation format;
    deleting unavailable links in each of the spectrum planes;
    searching the spectrum planes for a target path in order, wherein a starting node and a terminating node of the target path are the same as the pair of nodes, and a length of the target path is less than a transmission distance in the modulation format corresponding to the spectrum plane; and
    determining the target path found firstly as the working link.

5. The method according to claim 1, wherein the creating the protection link for the pair of nodes in the elastic optical network according to the shared path protection mechanism comprises:
    calculating the number of spectrum time slots required by spectrum planes in different modulation formats using an equation $$F = \frac{B_R}{B_i},$$

where F represents the number of spectrum time slots, $B_R$ represents the bandwidth requirement, i represents a number of the modulation format, and $B_i$ represents a frequency slot capacity of an i-th modulation format;

creating a spectrum plane list based on the calculated number of spectrum time slots required by spectrum planes in respective modulation formats, wherein each spectrum plane in the spectrum plane list comprises F spectrum time slots, and the spectrum plane is labeled by a corresponding modulation format;

deleting unavailable links in each of the spectrum planes, and deleting the working link in the elastic optical network corresponding to the virtual working link found in step S110 and the working link in the elastic optical network created in step S120;

searching the spectrum planes for a target path in order, wherein a starting node and a terminating node of the target path are the same as the pair of nodes, and a length of the target path is less than a transmission distance in the modulation format corresponding to the spectrum plane; and determining the target path found firstly as the protection link.

\* \* \* \* \*